United States Patent
Rogers et al.

(10) Patent No.: US 7,940,389 B2
(45) Date of Patent: May 10, 2011

(54) METHOD AND APPARATUS FOR DETECTING PRESSURE DISTRIBUTION IN FLUIDS

(75) Inventors: Alan John Rogers, Bookham (GB); Sotiris Emil Kanellopoulos, London (GB); Sergey Vladimir Shatalin, Moscow (RU)

(73) Assignee: Fotech Solutions Limited (GB)

( * ) Notice: Subject to any disclaimer, the term of this patent is extended or adjusted under 35 U.S.C. 154(b) by 907 days.

(21) Appl. No.: 11/597,777

(22) PCT Filed: May 25, 2005

(86) PCT No.: PCT/GB2005/002050
§ 371 (c)(1), (2), (4) Date: Jun. 11, 2007

(87) PCT Pub. No.: WO2005/116601
PCT Pub. Date: Dec. 8, 2005

(65) Prior Publication Data
US 2008/0068606 A1    Mar. 20, 2008

(30) Foreign Application Priority Data

May 25, 2004   (GB) .................................. 0411622.4

(51) Int. Cl.
*G01J 4/00* (2006.01)
(52) U.S. Cl. ...................................................... 356/365
(58) Field of Classification Search .................. 356/365
See application file for complete search history.

(56) References Cited

U.S. PATENT DOCUMENTS

| | | | |
|---|---|---|---|
| 4,489,602 A | 12/1984 | Henning | 73/327 |
| 5,164,608 A | 11/1992 | Vali et al. | 250/577 |
| 5,291,032 A | 3/1994 | Vali et al. | 250/577 |
| 5,384,635 A | 1/1995 | Cohen et al. | 356/73.1 |

(Continued)

FOREIGN PATENT DOCUMENTS

EP    0144 509    6/1985

(Continued)

OTHER PUBLICATIONS

Bertholds et al, "High-resolution photoelastic pressure sensor using low-birefringence fiber", Applied Optics, vol. 25, No. 3, Feb. 1, 1986.

(Continued)

*Primary Examiner* — Roy Punnoose
(74) *Attorney, Agent, or Firm* — Ballard Spahr LLP

(57) ABSTRACT

A pressure sensing apparatus has a light source for transmitting pulses of light along a monomode optical fiber. The polarization of light backscattered from the light pulses in the optical fiber is detected by a polarization processing unit (PPU) and a photo detector. The optical fiber is adapted to deform asymmetrically under the influence of applied external isotropic pressure, e.g. from a fluid. The deformation causes the birefringence of the optical fiber to change proportionally to the applied pressure. The change in birefringence can be determined from the detected polarization of the backscattered light, allowing detection of pressure distribution in the fluid. Importantly, the construction of the optical fiber is such that the birefringence beat length of the optical fiber at the wavelength of light propagated by the fiber remains more than twice the spatial length of the light pulses transmitted along the optical fiber. Applications of the invention include detection of fluid flow; location of an interface between two fluids of different density; and tsunami detection.

62 Claims, 8 Drawing Sheets

U.S. PATENT DOCUMENTS

| | | | |
|---|---|---|---|
| 5,515,459 A * | 5/1996 | Farhadiroushan | 385/12 |
| 5,828,059 A | 10/1998 | Udd | 250/277.18 |
| 6,208,776 B1 | 3/2001 | Prohaska et al. | 385/13 |
| 6,497,279 B1 | 12/2002 | Williams et al. | 166/250.01 |
| 6,501,067 B2 | 12/2002 | Jones et al. | 250/227.14 |
| 6,597,821 B1 | 7/2003 | Bohnert et al. | 385/12 |
| 6,618,677 B1 | 9/2003 | Brown | 702/13 |
| 6,630,658 B1 | 10/2003 | Bohnert et al. | 250/277.14 |

FOREIGN PATENT DOCUMENTS

| | | |
|---|---|---|
| EP | 0241766 | 10/1987 |
| FR | 2628205 | 9/1989 |
| FR | 2658291 | 8/1991 |
| GB | 2 137 767 | 10/1984 |
| GB | 2 190 186 | 11/1987 |
| GB | 2 243 908 | 11/1991 |
| JP | 6222067 | 8/1994 |
| JP | 7198454 | 8/1995 |
| JP | 08128869 | 5/1996 |
| JP | 11201841 | 7/1999 |
| JP | 2001264056 | 9/2001 |
| JP | 2002054974 | 2/2002 |
| JP | 2003166889 | 6/2003 |
| WO | WO 91/13329 | 9/1991 |
| WO | WO 93/17314 | 9/1993 |
| WO | WO 99/32863 | 7/1999 |
| WO | WO 01/75403 | 10/2001 |

OTHER PUBLICATIONS

Brandel et al, "Negative Poisson's ratio polyethylene foams", J. Materials Science, 36, 5885-5893, (Jul. 2001).

Clowes et al, "Pressure Sensitivity of Side-Hole Optical Fiber Sensors", IEEE Photonics Technology Letters, vol. 10, No. 6, Jun. 1998.

Croucher et al, "Approach to highly sensitive pressure measurements using side-hole fibre", Electronics Letters, Jan. 22, 1998 vol. 34 No. 2.

Giallorenzi et al, "Optical Fiber Sensor Technology", IEEE Journal of Quantum Electronics, vol. QE-18, No. 4, Apr. 1982.

Hill et al, "Fiber Bragg Grating Technology Fundamentals and Overview", Journal of Lightwave Technology, vol. 15, No. 8, Aug. 1997.

Hocker, "Fiber-optic sensing of pressure and temperature", Applied Optics, May 1, 1979, vol. 18, No. 9, 1445-1448.

Lakes et al, "Making and characterizing negative Poisson's ratio materials", International Journal of Mechanical Engineering Education, 30, 50-58, Jan. 2002.

Lakes et al, "Negative Poisson's ratio foam as seat cushion material", Cellular Polymers, 19, 157-167, Jul. 2000.

Rashleigh, "Origins and Control of Polarization Effects in Single-Mode Fibers", Journal of Lightwave Technology, vol. LT-1, No. 2, Jun. 1983.

Schroeder et al, "High Pressure and Temperature Sensing for the Oil Industry Using Fiber Bragg Gratings Written onto Side Hole Single Mode Fiber", SPIE Proceedings, vol. 3746, p. 42, 1999.

The Economist, Science & Technology. "The next big wave", Aug. 14, 2003.

Xie et al, "Side-hole fiber for fiber-optic pressure sensing", Optics Letters, May 1986, vol. 11, No. 5.

Xu et al, "Optical In-Fibre Grating High Pressure Sensor", Electronics Letters, Feb. 18, 1993, vol. 29, No. 4.

Yamate et al, "Thermally Insensitive Pressure Measurements up to 300 degree C Using Fiber Bragg Gratings Written onto Side Hole Single Mode Fiber", SPIE Proceedings, vol. 4185, p. 628, 2000.

Yunqi Liu et al, "Simultaneous pressure and temperature measurement with polymer-coated fibre Bragg grating", Electronics Letters, Mar. 16, 2000, vol. 36, No. 6.

Zhang et al, "High-Sensitivity Pressure Sensor Using a Shielded Polymer-Coated Fiber Bragg Grating", IEEE Photonics Technology Letters, vol. 13, No. 6, Jun. 2001.

* cited by examiner

A - Range 200-1000bar
B - Range 800-1000bar
C - Range 200-600bar
D - Range 400-600bar ns to Great Britain
METHOD AND APPARATUS FOR DETECTING PRESSURE DISTRIBUTION IN FLUIDS

CROSS REFERENCE TO RELATED APPLICATIONS

The present application claims priority to Great Britain Patent Application No. 0411622.4 filed May 25, 2004, which application is incorporated herein fully by this reference.

FIELD OF THE INVENTION

This invention relates to a method and apparatus for detecting pressure distribution in fluids, particularly, but not exclusively, by analysing a single mode side-hole optical fibre using polarisation optical time domain reflectometry. The invention also includes methods and apparatus for measuring fluid flow; determining the location of an interface between two fluids of different densities; and detecting tsunamis.

BACKGROUND TO THE INVENTION

When external pressure is applied to an optical fibre, the core of the fibre experiences strain which varies with the applied pressure. Due to a phenomenon known as the "elasto-optic effect", the way in which light propagates in the fibre's core changes as the strain experienced by the core changes. So, by looking at the way in which the light propagation properties of the fibre's core change, changes in strain and hence pressure applied to the fibre can measured.

Most conventional optical fibres have circular symmetry in cross section and, indeed, are uniformly cylindrical. This means that when external isotropic pressure is applied to them, e.g. when they are immersed in fluid, mechanical stress of substantially the same magnitude in every direction orthogonal to the length of the fibre is applied to the fibre's core. Any deformation of the core is therefore substantially uniform orthogonal to its length. In addition, the silica from which optical fibres are usually made is relatively incompressible. The strain experienced by the fibre's core is therefore relatively small for a given pressure and the optical properties of standard optical fibres only vary very slightly with changes in external isotropic pressure. This insensitivity makes them fairly impractical for pressure measurement.

It has therefore been suggested to use optical fibres adapted to experience asymmetrical strain at their cores under the influence of isotropic external pressure for measuring pressure in fluids. One such fibre is known as a side-hole fibre. A side-hole fibre typically has two air holes that extend parallel to the core along the length of the fibre, the holes being positioned on either side of the core. The presence of the air holes means that the core of the fibre experiences less stress in a direction transverse to its length that extends between the air holes than in other directions transverse to its length when isotropic external pressure is applied to the fibre. Indeed, the direction of greatest stress is that orthogonal to a line extending between the air holes. The core therefore experiences greater strain in this direction than others. One consequence of the asymmetrical strain experienced by side-hole fibres is that the refractive index of the fibre's core changes more for light linearly polarised in the direction of greatest strain than for light linearly polarised in the orthogonal direction. In other words, the fibre's birefringence changes, with the so-called fast axis in the direction of greatest strain. The change in birefringence is proportional to the applied external isotropic pressure and large in comparison to changes in optical properties of standard optical fibres. Side-hole fibres are therefore much more useful for pressure measurement than standard fibres.

Changes in fibre birefringence can be measured in a variety of ways. One well established method involves use of a Bragg grating written in the fibre, often referred to as a Fibre Bragg Grating (FBG). FBGs are described, for example, in the paper "Fiber Bragg Grating Technology Fundamentals and Overview", Kenneth O. Hill et al, Journal of Lightwave Technology, Vol. 15, No. 8, August 1997. Briefly, an FBG comprises a periodic modulation in the isotropic refractive index of a fibre's core along the length of the core. This modulation can be written into the core using interfering coherent light, e.g. using an ultra violet (UV) laser and an appropriate optical arrangement to create a standing wave in the fibre that selectively heats the fibre's core to change its refractive index at the desired locations to create a grating. When light travels along an FBG, some of it is reflected, with the reflection occurring most strongly at a wavelength of light known as the Bragg wavelength $\lambda_B$, which can be expressed as $$\lambda_B = 2n\Lambda_B$$

where n is the refractive index of the fibre and $\Lambda_B$ is the period of the grating. Changes in refractive index of the fibre therefore cause proportional changes in the Bragg wavelength $\lambda_B$. Indeed, a change in the birefringence of a side-hole fibre at the FBG results in there being effectively two Bragg wavelengths, with one wavelength being more sensitive to changes in applied external isotropic pressure than the other. This allows measurement of applied external isotropic pressure and some compensation for other influences on fibre birefringence, such as temperature. This is described in more detail, for example, in the paper "Thermally Insensitive Pressure Measurements up to 300° C. Using Fiber Bragg Gratings Written on to Side Hole Single Mode Fiber", Tsutomu Yamate et al, SPIE Proceedings, Vol. 4185, p 628, 2000.

Another method involves the use of a polarisation rocking filter. This is described, for example, in the paper "Approach to Highly Sensitive Pressure Measurements Using Side-Hole Fibre", J. A. Croucher et al, Electronics Letters, Vol. 34, No. 2, 22 Jan. 1998. Briefly, unlike an FBG, which comprises a periodic modulation of a fibre core's isotropic refractive index, a rocking filter comprises a periodic modulation of the core's birefringence. A rocking filter converts light travelling along the filter between two orthogonal polarisation states. The wavelength $\lambda_R$ at which this conversion occurs most strongly, i.e. the resonant wavelength, can be expressed as $$\lambda_R = b\Lambda_R$$

where b is the fibre birefringence and $\Lambda_B$ is the pitch of the grating. So, as the birefringence b of a side hole fibre in which a rocking filter is written changes, the wavelength $\lambda_R$ of light most strongly converted from one polarisation state to the orthogonal polarisation state as it passes through the rocking filter changes proportionally. Again, this allows measurement of external isotropic pressure applied to the fibre. It has been found that the use rocking filters can allow measurements up to 80,000 times more sensitive to changes in applied pressure than measurements using FBGs.

However, the use of side-hole fibres incorporating either FBGs or rocking filters has a number of problems. In particular, pressure can only be measured at the location of the FBG or rocking filter. This means that the measurement is restricted by the size and location of the FBG or rocking filter along the length of the fibre. This significantly limits the usefulness of optical fibres for pressure measurement.

For example, an FBG typically has a pitch $\Lambda_B$ below 1 µm and light is strongly reflected by an FBG of only a few cm in length. So, changes in applied external pressure measured using an FBG only relate to the pressure applied to the fibre over a few cm of its length. Furthermore, it is very difficult to measure the pressure applied to a fibre at multiple positions along its length using FBGs, as the provision and use of multiple FBGs in a single optical fibre is limited and complex. For example, in order to distinguish between different FBGs, the different FBGs need to be addressed using light of slightly different wavelengths, say around 2 nm apart from one another. As it is only possible to interrogate the fibre with light having a limited wavelength range, say around 60 nm, the number of different FBGs that can be used in a single fibre is severely limited, say to around 30. This can be mitigated to some extent by looking at light reflected at different times from a light pulse travelling along the fibre to distinguish between light reflected at different FBGs. In other words, some wavelength re-use can be achieved using time division multiplexing. However, it is impossible to avoid totally influence by other FBGs on the light reflected in one FBG. In other words, cross talk between the FBGs inevitably occurs. Even using time division multiplexing, the maximum likely number of FBGs that could be used in a single fibre is therefore around 100.

Similar problems occur with rocking filters. The pitch $\lambda_R$ of a typical rocking filter written in a side-hole fibre is longer (e.g. at least 2000 times longer) than that of an FBG and can range from a few millimeters to a few meters. This means that measurements of applied pressure using a single rocking filter generally relate to the average pressure over a considerable length of the fibre. It is also difficult to measure the pressure applied to a fibre at multiple positions along its length as the provision and use of multiple rocking filters in a single fibre is limited and complex. Like FBGs, the number of rocking filters that can be used in a single fibre is limited by wavelength restrictions and crosstalk problems, with again only a very few rocking filters being useable in a single fibre.

Another problem is that the fabrication of side-hole fibres incorporating FBGs or rocking filters is relatively complex and expensive. More specifically, writing FBGs and rocking filters in optical fibres is a difficult and time consuming process. Sensor heads incorporating FBG and rocking filter fibres can therefore be relatively expensive. This is a particular problem when the sensor heads are used in harsh or dangerous environments in which they are likely to be damaged.

The present invention seeks to overcome these problems.

SUMMARY OF THE INVENTION

According to a first aspect of the present invention, there is provided an apparatus for detecting pressure distribution in a fluid, the apparatus comprising:

a single mode optical waveguide for immersion in the fluid, the optical waveguide being adapted to deform asymmetrically transverse to its length on exertion of substantially isotropic pressure by the fluid such that birefringence of the waveguide varies with the exerted pressure;

a light source for directing pulses of polarised light into the waveguide;

a polarisation detector for detecting polarisation states of light backscattered from the light pulses in the waveguide; and a processor for deriving an indication of the birefringence of at least part of the waveguide from the detected polarisation states to detect pressure distribution in the fluid.

According to a second aspect of the present invention, there is provided a method of detecting pressure distribution in a fluid using a single mode optical waveguide immersed in the fluid, the optical waveguide being adapted to deform asymmetrically transverse to its length on exertion of substantially isotropic pressure by the fluid such that birefringence of the waveguide varies with the exerted pressure, the method comprising:

directing pulses of polarised light into the waveguide;

detecting polarisation states of light backscattered from the light pulses in the waveguide; and deriving an indication of the birefringence of at least part of the waveguide from the detected polarisation states to detect pressure distribution in the fluid.

So, the optical waveguide is adapted to experience greater strain in one direction across its length (e.g. for an optical fibre, across its core) than in other directions across its length under influence of external isotropic pressure. This means that the birefringence of the waveguide changes in proportion to the pressure of the fluid in which it is immersed. An example of a suitable waveguide is a side hole optical fibre.

Changes in the birefringence of the waveguide can be detected by looking at the polarisation states of light backscattered (e.g. by Rayleigh backscattering) in the waveguide. One technique for doing this is known as Polarisation Optical Time Domain Reflectometry (POTDR), as described, for example, in International patent publication no. WO 02/095349 and the paper "Measurement of the Spatial Distribution of Birefringence in Optical Fibers", Wuilpart et al, IEEE Photonics Technology Letters, Vol. 13, No. 8, August 2001.

Backscattering and, in particular, Rayleigh backscattering (which is caused by small imperfections and inhomogeneities in the propagation medium of the waveguide, e.g. the silica core of an optical fibre) occurs naturally in optical waveguides. So, it is possible to derive an indication of the birefringence of the waveguide at any point along its length from the polarisation states of light backscattered in the waveguide. Unlike pressure detectors using FBG and rocking filter fibres, the invention is not therefore limited to detecting pressure at predetermined locations along the length of the waveguide, e.g. where an FBG or rocking filter is positioned. Rather, pressure can be detected at any selected location(s) along the length of the waveguide or over the entire length of the waveguide. This makes the invention far more useful for the detection of pressure differential.

So, the at least part of the waveguide for which an indication of birefringence can be derived can be the whole length of the waveguide; or (a) selected part(s) of the length of the waveguide. This is achieved simply by detecting the polarisation states of light backscattered at appropriate positions along the length of the waveguide. It is therefore preferred that the polarisation detector is able to detect the polarisation state of light following backscattering at different points along the length of the waveguide and that the at least part of the waveguide for which the processor derives an indication of birefringence is between at least some of these points.

It can also be appreciated that the invention can be used to detect either or both temporal or spatial pressure distribution(s). For example, the processor can derive an indication of the variation of birefringence along the waveguide to detect spatial pressure distribution in the fluid. Similarly, the processor can derive an indication of birefringence of the at least part of the waveguide more than once to detect temporal pressure distribution in the fluid. The term "pressure distribution" is therefore intended to refer to both time varying and spatially varying pressure in the absence of further limitation.

Rayleigh backscattering tends to be a relatively strong phenomenon in comparison to other scattering phenomena, such as Raman and Brillouin scattering, which may be around 30 to 40 dB weaker and around 15 to 20 dB weaker respectively. This means that the invention can take measurements from the backscattered light more quickly than apparatus designed to use Raman or Brillouin scattering, and results can be obtained faster.

Yet another advantage is that the waveguide of the invention, and hence a sensor head incorporating the waveguide, is relatively simple and cheap to manufacture, as the waveguide does not have a grating of any sort written in it.

The birefringence of the waveguide broadly depends on two factors: the waveguide's intrinsic birefringence and its induced birefringence. Intrinsic birefringence is generally considered to be the birefringence of the waveguide in the absence of any external influences on the waveguide, such as externally applied stress and pressure, magnetic and electric fields or temperature variation. For example, intrinsic birefringence of the waveguide is typically determined at a neutral pressure (e.g. atmospheric pressure). For an optical fibre, intrinsic birefringence results, e.g., from inhomogeneity in the materials from which the fibre is made; variations in the fibre's geometry along its length; and strain occurring in the fibre's core in the absence of external influences. The waveguide's induced birefringence is a change in the waveguide's birefringence caused when external isotropic pressure is applied to the waveguide, e.g. when it is immersed in the fluid. Of course, in a broader context, it is basically the component of the waveguide's birefringence caused by external influences.

In order to maximize the sensitivity of FBGs and rocking filters to changes in applied pressure, it is necessary to use optical fibres that have high intrinsic birefringence or at least demonstrate very large changes in induced birefringence with applied pressure. However, optical waveguides having high birefringence are not well suited to use with the invention. The higher the birefringence of the waveguide, the shorter the length of the light pulses that need to be used to successfully resolve polarisation states useful in deriving waveguide birefringence. However, the light pulses cannot be too short, as this makes it hard to detect light backscattered in the waveguide. More specifically, shorter light pulses must have greater intensity and this leads to unwanted and confusing non-linear effects in the backscatter process. The optical waveguide of the invention preferably therefore has low birefringence. More specifically, it is preferred that the birefringence of the optical waveguide remains low over the range of fluid pressures in which it is intended to use the waveguide. This is considered to be new in itself and, according to a third aspect of the present invention, there is provided an optical waveguide for use in detecting pressure differential in a fluid, the waveguide being adapted to deform asymmetrically transverse to its length on exertion of substantially isotropic pressure by the fluid such that the birefringence of the waveguide varies with the exerted pressure, but remains low over the range of fluid pressures in which it is intended to use the waveguide. Likewise, according to a fourth aspect of the present invention, there is provided a method of detecting pressure distribution in a fluid using a waveguide adapted to deform asymmetrically transverse to its length on exertion of substantially isotropic pressure by the fluid such that the birefringence of the waveguide varies with exerted pressure, but remains low over the range of fluid pressures in which it is intended to use the waveguide. Furthermore, according to a fifth aspect of the present invention, there is provided a method of manufacturing an optical waveguide for use in detecting pressure distribution in a fluid, the waveguide being adapted to deform asymmetrically transverse to its length on exertion of substantially isotropic pressure by the fluid such that birefringence of the waveguide varies with the exerted pressure, the method comprising selecting the birefringence of the waveguide to remain low over the range of fluid pressures in which it is intended to use the waveguide.

This can be achieved in several ways. For example, the optical waveguide may have low intrinsic birefringence. This can help to keep the birefringence of the optical fibre low in the presence of induced birefringence. The birefringence of the waveguide typically comprises just the sum of the intrinsic birefringence of the waveguide, which is determined at a neutral pressure, and induced birefringence caused by pressure exerted on the waveguide by the fluid. The waveguide may therefore be arranged such that birefringence induced by increasing fluid pressure opposes (the) intrinsic birefringence of the waveguide. In other words, the induced birefringence can oppose the intrinsic birefringence as the pressure increases from the neutral pressure. This means that the induced birefringence can act say to reduce the waveguide's birefringence from a given value of intrinsic birefringence as the pressure exerted by the fluid increases. In other words, induced birefringence might subtract from intrinsic birefringence.

The applicants have also recognised that careful selection of the level of intrinsic birefringence and the sensitivity of the fibre's induced birefringence can allow a pressure range over which the waveguide is effective for detecting pressure to be selected as desired. In particular, a value of intrinsic birefringence can be selected such that the waveguide has substantially zero birefringence at a pressure offset from atmospheric pressure to define a range of fluid pressures detectable using the waveguide. Similarly, the deformability of the waveguide can be selected to control the rate of change of induced birefringence with increasing fluid pressure and thereby to define a/the range of fluid pressures detectable using the waveguide.

Birefringence can be quantified by birefringence beat length $L_B$, which is the length of a waveguide over which the retardance between two orthogonal eigenmodes of polarised light becomes $2\pi$ rad. A high birefringence optical fibre typically has birefringence beat length below 10 cm. A moderate birefringence optical fibre typically has birefringence beat length between 10 cm and 1 m. A low birefringence optical fibre typically has birefringence beat length over 1 m. It is therefore preferred that the optical waveguide of the invention has birefringence beat length of more than around 1 m over the range of fluid pressures in which it is intended to use the waveguide. Indeed, it is preferred that the intrinsic birefringence beat length of the waveguide is longer than around 10 m.

As mentioned above, the length of the light pulses that can be used to obtain useful polarisation information from the waveguide is related to the birefringence of the waveguide. More specifically, the applicants have identified that the birefringence beat length should be at least twice as long as the light pulse so that the detected polarisation states contain a strong indication of the birefringence of the waveguide. Expressed differently, the spatial length of the light pulse is preferably less than around ½ of the minimum expected birefringence beat length of the waveguide due to both intrinsic and induced birefringence over the pressure range in which it is intended to use the waveguide. On the other hand, the light pulse should be long enough to make the polarisation states practically measurable. So, the spatial length of the light pulse is preferably between around ¼ to ½ of the minimum expected birefringence beat length of the waveguide. Even more specifically, it is ideally around ½ the minimum expected beat length of the waveguide. Typically, the minimum expected birefringence beat length might again be around 1 m.

The optical waveguide may take a variety of forms, but it is typically an optical fibre. This usually comprises a cladding and core of different refractive indices, e.g. made from silica. Alternatively, the optical waveguide may be a photonic crystal fibre (PCF). PCFs comprise an array of cavities extending along the length of the fibre that diffract light in a controlled manner to guide light along the length of the fibre.

Similarly, the waveguide may be adapted to deform asymmetrically transverse to its length on application of substantially isotropic pressure by the fluid in an almost endless variety of ways. However, in one preferred example, the waveguide has one or more holes extending along its length that make the waveguide more compressible in one direction across its length than others. Preferably the waveguide has two such holes arranged on opposite sides of a core. This should result in the core being compressed less in the direction extending between the holes than in other directions on application of external isotropic pressure. In other words, it is preferred that the optical waveguide is a side-hole optical fibre.

In the case of a side-hole fibre, the induced birefringence caused by external isotropic pressure can be determined by the dimensions and positioning of the holes. In particular, it is preferred that, where there are two holes, one on either side of the core, the angle subtended by the radius of each hole around the centre of the core should be less than around 10°. Such a fibre is suitable for use in pressure ranges between around 100 bar and around 2000 bar. For pressure ranges between around 10 bar and around 100 bar, the angle need only be less than around 25°.

In another example, the optical waveguide may comprise an optical fibre with a cladding that is substantially cylindrical apart from a segment that is effectively cut away (e.g. not present, but not necessarily removed by cutting) on one side of the fibre, e.g. so that there is a substantially flat surface on one side of the fibre. In other words, the optical waveguide may be a D-shaped optical fibre. Like side-hole optical fibres, D-shaped optical fibres deform asymmetrically transverse to their length on application of substantially isotropic pressure.

The invention has a vast number of actual and potential applications. For example, the detection of fluid pressure is very important in down-holes of oil wells. The optical waveguide can therefore be placed in a down-hole of an oil well to detect pressure distribution of fluid, e.g. oil and/or water, in the down-hole. By calibrating the relation between waveguide birefringence and fluid pressure appropriately and continually monitoring birefringence along the length of the waveguide, the actual fluid pressure along the down-hole can be monitored.

In other examples, the optical waveguide can be placed in a variety of other fluid pipes and such like to monitor pressure. In particular, the optical waveguide might be placed in a water main, where changes in pressure along the length of the water main can be indicative of blockages and leaks.

In yet another example, the fluid flow can be detected. An apparatus for detecting fluid flow might comprise: the apparatus described above wherein the derived indication detects the distribution along the waveguide of the pressure exerted by the fluid on the waveguide; and means for distinguishing a component of the indication resulting from static fluid pressure from a component of the indication resulting from fluid flow. Similarly, a method of detecting fluid flow might comprise: the method described above wherein the derived indication detects the distribution along the waveguide of the pressure exerted by the fluid on the waveguide; and distinguishing a component of the indication resulting from static fluid pressure from a component of the indication resulting from fluid flow. Indeed, this is considered to be new in itself and, according to a sixth aspect of the present invention, there is provided an apparatus for detecting fluid flow, the apparatus comprising:

an optical waveguide for extending through the fluid;

means for deriving an indication of the distribution along the waveguide of pressure exerted by the fluid on the waveguide; and means for distinguishing a component of the indication resulting from static fluid pressure from a component of the indication resulting from fluid flow.

Also, according to a seventh aspect of the present invention, there is provided a method of detecting fluid flow using an optical waveguide extending through the fluid, the method comprising:

deriving an indication of the distribution along the waveguide of pressure exerted by the fluid on the waveguide; and distinguishing a component of the indication resulting from static fluid pressure from a component of the indication resulting from fluid flow.

In other words, the variation in pressure along the length of the optical waveguide can be determined, e.g. using the method described above. It is then possible to distinguish the portion of this variation, if any, that is due to static pressure from the portion that is due to dynamic pressure or fluid flow. This is possible because the portion of the pressure variation that results from static pressure has predictable characteristics.

For example, the optical waveguide may be arranged to extend across the height of the fluid (e.g. from at least one height to another height and preferably across most or all of the height of the fluid). The distinguishing means may then comprise means for identifying variations in pressure uncharacteristic of changing height. More specifically, as pressure changes linearly with fluid height, deviations from this linear increase can be attributed to fluid flow reliably (provided any likely other factors are taken into account). So, in one example, the distinguishing means can subtract a linear component of the indication to leave the component resulting from fluid flow. In another example, changes in the rate of change of the pressure distribution along the waveguide can be identified as boundaries of fluid flow.

Alternatively the optical waveguide can be arranged to extend substantially horizontally in the fluid. This means that there should be substantially no difference in static pressure along the length of the waveguide. So, the distinguishing means may then comprise means for holding the waveguide horizontally in the fluid. Any variation in pressure along the waveguide can then be attributed to fluid flow (provided any likely other factors are taken into account).

Of course, detecting the pressure distribution along a single waveguide typically only provides a one-dimensional pressure distribution, e.g. in the direction that the waveguide extends. Should it be desired to map pressure in two dimensions, an optical waveguide grid may be used. The apparatus preferably therefore comprises an optical waveguide grid for extending through the fluid. The grid might comprise a single optical waveguide bent to cross back and forth over itself, e.g. substantially at right angles. This allows a single pressure indication derivation means (e.g. light source, polarisation detector and processor) to be used. In another example, the waveguide grid may comprise several waveguides arranged to cross one another, e.g. substantially at right angles. The grid (or individual parts or waveguides of the grid) can be arranged to extend across the height of the fluid or horizontally, as described above in relation to a single waveguide above, to account for the contribution of static pressure to the derived pressure indication and allow detection of fluid flow.

The distinguishing means can take a variety of forms. In a straightforward example, the distinguishing means might be a display, such as a computer monitor, that is able to display a graphical representation of the pressure distribution. However, distinguishing the component of the indication resulting from static fluid pressure from the component of the indication resulting from fluid flow lends itself to automation and the distinguishing means may therefore be a processor running appropriate software or such like.

In another example, an interface between two fluids of different density may be the located. An apparatus for locating of an interface between two fluids of different density might comprise the apparatus described above, wherein the waveguide is able to extend through the fluids, and means for locating a change in the gradient of the detected pressure distribution along the waveguide to locate the fluid interface. Likewise, a method of locating of an interface between two fluids of different density might comprise the method described above, wherein the waveguide extends through the fluids and locating a change in the gradient of the detected pressure distribution along the waveguide to locate the fluid interface. Indeed, this is considered to be new in itself and, according to an eighth aspect of the present invention, there is provided an apparatus for locating of an interface between two fluids of different density, the apparatus comprising:

an optical waveguide for extending through the fluids;

a detector for detecting a distribution along the waveguide of pressure exerted by the fluids on the waveguide; and means for locating a change in the pressure gradient along the waveguide to locate the fluid interface.

Also, according to a ninth aspect of the present invention, there is provided a method of locating of an interface between two fluids of different density using an optical waveguide extending through the fluids, the method comprising:

detecting a distribution along the waveguide of pressure exerted by the fluids on the waveguide; and locating a change in the pressure gradient along the waveguide to locate the fluid interface.

So, the distribution of pressure along the length of the waveguide can be used to identify the interface between two fluids of different density. This is possible because pressure change with fluid depth is proportional to fluid density. The rate of change of pressure in the two fluids will therefore be different. Variation in the rate of change of pressure along the waveguide can therefore be used to identify and locate the fluid interface.

Of course, where there are more than two fluids of different density present, multiple such interfaces can be located. However, these aspects of the invention are primarily concerned with the location of a single interface. Typically, the fluids are immiscible, as immiscible fluids tend to have a clearly defined interface between one another. For example, the fluids might be oil and water in a cavity. In other examples, the fluids might just have a tendency to separate. For example water or oil containing a suspension of solid particles can settle into two or more layers of different density fluids, e.g. water and slurry.

A particular application of this aspect of the invention is estimating the amount of oil left in a reservoir, e.g. a natural subterranean oil reservoir. This might involve estimating the volume of the reservoir, e.g. by seismic surveying, and determining the depth of oil in the reservoir using the invention. Effective oil volume estimation allows for efficient reservoir management and control, leading to optimisation of oil yield and production rates. This is extremely valuable in oil extraction.

The locating means can take a variety of forms. In a straightforward example, the locating means might be a display, such as a computer monitor, that is able to display a graphical representation of the pressure distribution and, e.g., distance along the waveguide. However, locating the change in the pressure gradient along the waveguide lends itself to automation and the locating means may therefore be a processor running appropriate software or such like.

In another example, a tsunami may be detected. An apparatus for detecting a tsunami may comprise the apparatus described above, wherein the waveguide is able to extend underwater along an expected path of a tsunami, the processor derives an indication of the distribution along the waveguide of the pressure exerted by the water on the waveguide and having means for determining when changes in the distribution are characteristic of a tsunami travelling through the water along the expected path. Likewise, a method of detecting a tsunami may comprise the method described above, wherein the optical waveguide extends underwater along the expected path of a tsunami, the derived indication is of the distribution along the waveguide of the pressure exerted by the water on the waveguide, and determining when changes in the distribution are characteristic of a tsunami travelling through the water along the expected path. Indeed, this is considered to be new in itself and, according to a tenth aspect of the present invention, there is provided an apparatus for detecting a tsunami, the apparatus comprising:

an optical waveguide for extending underwater along an expected path of a tsunami;

a detector for detecting a distribution along the waveguide of pressure exerted on the waveguide by the water;

and means for determining when changes in the detected pressure distribution are characteristic of a tsunami travelling through the water along the expected path.

Also, according to an eleventh aspect of the present invention, there is provided a method of detecting a tsunami using an optical waveguide extending underwater along an expected path of a tsunami, the method comprising:

detecting a distribution along the waveguide of pressure exerted on the waveguide by the water;

and determining when changes in the detected pressure distribution are characteristic of a tsunami travelling through the water along the expected path.

So, by looking at the distribution of external isotropic pressure along (e.g. the length or the whole length of) the optical waveguide over time, the propagation of a tsunami can be detected. These aspects of the invention are particularly effective, as the waveguide can extend over several tens of kilometers. Not only does this allow remote detection of the tsunami, it can help to provide effective early warning, well before a tsunami reaches a coast. Furthermore, changes in the distribution of pressure exerted along the waveguide by a tsunami can provide useful scientific data about the nature of tsunamis, not always possible with other systems that have shorter reach and/or restricted pressure measurement locations.

In this regard, the waveguide may of course be located at any appropriate position along the expected path of a tsunami, e.g. close to a geographical fault line or such like. However, it is preferred that the waveguide is arranged to extend away from a coastline, e.g. substantially perpendicular to the coastline. This allows the detector and determining means to be conveniently located on land. The long reach of the waveguide makes this possible.

Similarly, the waveguide may be positioned at any convenient depth. This is possible because the pressure fluctuation of a tsunami extends throughout the depth of the water in which they travel. In one example, buoys may be attached to the optical waveguide to support it substantially horizontally in the water (at the desired depth). One advantage of this is that the effect of water depth on pressure along the length of the waveguide can be kept constant, which can make changes in pressure easier to measure. In another example, the waveguide may be adapted to extend along the seabed. This can make deployment and maintenance of the waveguide more straightforward.

One waveguide may be sufficient to allow effective detection of a tsunami. However, it is again preferred that there are several waveguides. Each waveguide may have its own detector (e.g. light source, polarisation detector and processor). However, the determining means may determine when changes in the detected pressure distributions of more than one, e.g. all, of the waveguides are characteristic of a tsunami travelling through the water along the expected path. In other words, the determining means may compare the detected pressure distributions of the waveguides.

Tsunamis typically have wavelengths approaching a few kilometers in deep water, which makes them hard to detect. For this reason, it is important for the determining means to look at the distribution of pressure exerted along the waveguide. More specifically, the determining means can look at changes in the pressure distribution that move along the length of the waveguide. In particular, the determining means may determine that changes in the detected pressure distributions of more than one waveguide are characteristic of a tsunami travelling through the water when each distribution includes a wave of increased pressure moving along the length of the respective waveguide at approximately the same speed. This is particularly useful in eliminating spurious wave events.

Use of the word "processor" is intended to be general rather than specific. Whilst the invention may be implemented using an individual processor, such as a central processing unit (CPU), it could equally well be implemented using other suitable components or apparatus. For example, the invention could be implemented using a hard-wired circuit or circuits, e.g. an integrated circuit, or using embedded software. It can also be appreciated that the invention can be implemented, at least in part, using computer program code. According to a twelfth aspect of the present invention, there is therefore provided computer software or computer program code adapted to carry out the method described above when processed by a processing means. The computer software or computer program code can be carried by computer readable medium. The medium may be a physical storage medium such as a Read Only Memory (ROM) chip. Alternatively, it may be a disk such as a Digital Video Disk (DVD-ROM) or Compact Disk (CD-ROM). It could also be a signal such as an electronic signal over wires, an optical signal or a radio signal such as to a satellite or the like. The invention also extends to a processor running the software or code, e.g. a computer configured to carry out the method described above.

Similarly, use of the word "fluid" refers to both liquids and gases unless otherwise qualified. More specifically, the invention can be used to measure pressure distribution in both gases and liquids or, indeed, any medium capable of exerting isotropic pressure on a waveguide.

Preferred embodiments of the invention are now described, by way of example only, with reference to the accompanying drawings.

DETAILED DESCRIPTION OF THE PREFERRED EMBODIMENTS

Figure 1:
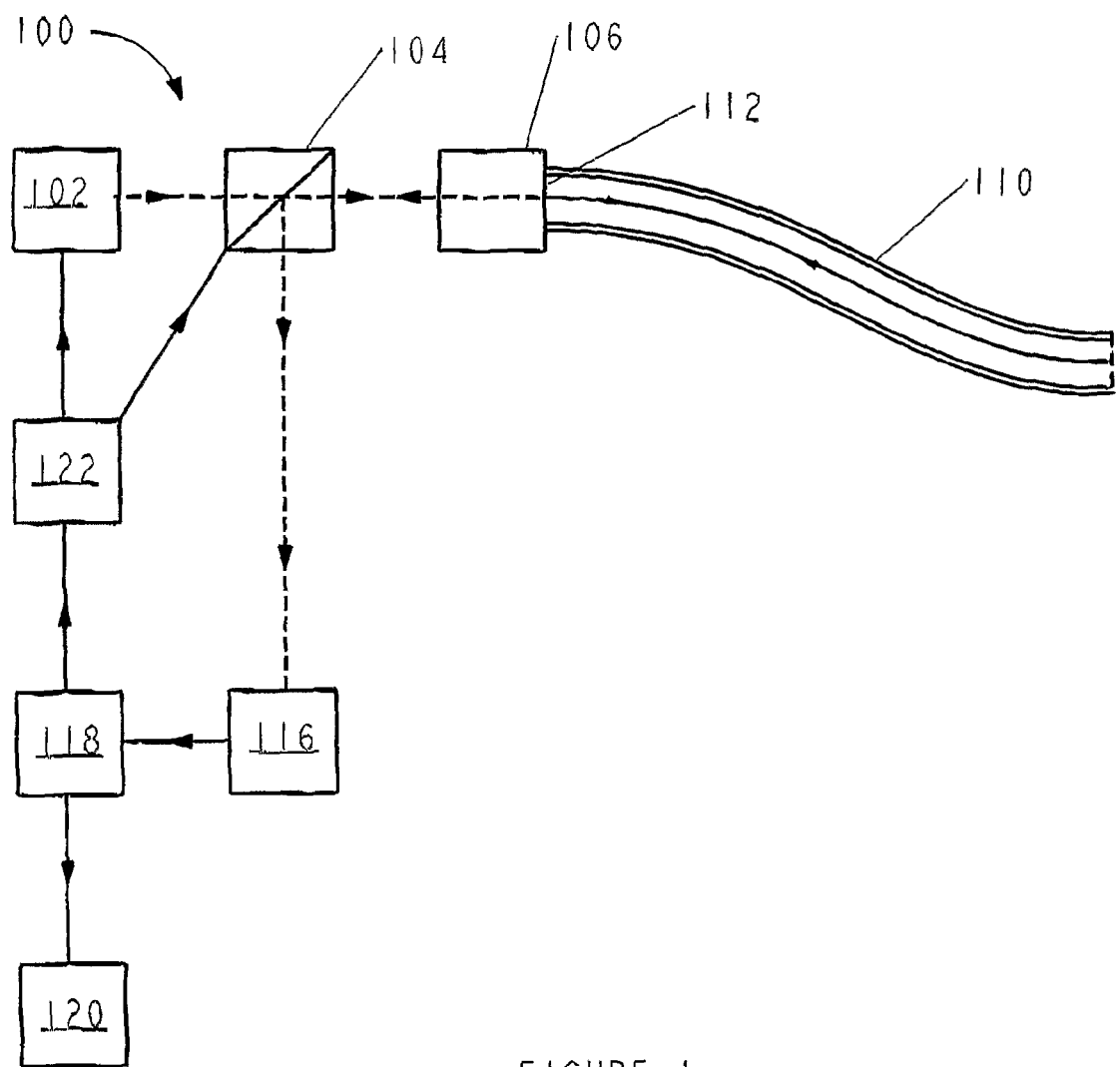
FIG. 1 is a schematic illustration of a pressure sensing apparatus according to the invention.

Referring to FIG. 1, a pressure sensing apparatus 100 comprises a light source 102 which, in this embodiment, is a tunable laser able to transmit coherent light across a range of wavelengths between around 1550 nm and 1560 nm. (In other embodiments, any range of wavelengths between about 1300 nm and 1600 nm could be used.) Light transmitted by the light source 102 is directed into a polarisation processing unit (PPU) 104. The PPU 104 is operable to condition the polarisation state of the light received from the light source 102 and to transmit some of the light incident on it from the light source 102 to an optical coupler 106.

The optical coupler 106 is attached to an end 112 of an optical fibre 110 and directs light from the PPU 104 into the optical fibre 110 through the end 112 of the optical fibre 110 to which it is attached. The optical coupler 106 also transmits light emitted from the end 112 of the optical fibre 110, for example by backscattering in the optical fibre 110, to the PPU 104. The polarisation state of this emitted, e.g. backscattered, light is analysed by the PPU 104 in combination with the photo detector 116 and a processor 118. More specifically, the PPU 104 is able to separate the light emitted from the end 112 of the optical fibre 110 into four components, each of which define the intensity of light polarised in a particular direction. These four components define the polarisation state of light in the Stokes formalism and are output by the PPU 104 to the photo detector 116, which in this example is a photo diode array. The photo detector 116 is able to detect the intensity of the light in each of the components isolated by the PPU 104 and output data defining the detected light intensities to the processor 118.

In this embodiment, the processor 118 is the central processing unit (CPU) of a personal computer (PC) and is connected to a display 120, which, in this embodiment, is a monitor of the PC. The processor 118 is able to analyse the data output by the photo detector 116 and derive the birefringence b(z) of the optical fibre 110 (where z is a vector along the length of the fibre 110), as set out in more detail below, and output the results to the display 120.

The processor 118 is also connected to a light source and PPU controller 122 for controlling the light source 102 and PPU 104. The light source and PPU controller 122 is operable to select: the wavelength of light emitted by the light source 102; light pulse timing; and light pulse duration, along with the polarisation state of light emitted by the PPU 104. Control of the timing and duration of the light pulses emitted by the light source 102, in combination with the timing of the output of the photo detector 116 allows the processor 118 to distinguish the polarisation state of light backscattered in different parts of the optical fibre 110. In other words, backscattering in different sections of the optical fibre 110 can be resolved by the processor 118.

The fibre 110 has birefringence b, which is equivalent to the difference $\Delta n$ between the refractive indices n of the two polarisation eigenmodes of light propagated by the fibre 110. More specifically, in a substantially neutral pressure environment, e.g. at atmospheric pressure, the fibre 110 has intrinsic birefringence $b_0$ resulting from its inherent structure. When the fibre 110 has isotropic external pressure exerted on it, e.g. when it is immersed in a fluid, the fibre's core experiences asymmetric strain. This asymmetric strain causes the birefringence b of the fibre 110 to change, e.g. for the fibre 110 to experience induced birefringence $b_i$.

Birefringence b is strictly a dimensionless quantity. However, it often expressed as a value of rad/m for a given wavelength of light. This is particularly common in relation to monomode optical fibres, as these fibres are designed predominantly to carry light at only a single operating wavelength $\lambda$ (in this embodiment around 1550 nm to 1560 nm) and the quoted value of birefringence b is implicitly based on this operating wavelength $\lambda$. Alternatively, birefringence b can be expressed as a value of birefringence beat length $L_b$, which is linked to the operating wave length $\lambda$ by the relation $$L_B = \frac{\lambda}{b}$$

In order to extract a backscatter polarisation signal that can be used to determine the value of the local beat length $L_b$ of the fibre 110, the local beat length $L_b$ of the fibre 110 should ideally be at least twice the spatial length of the light pulse used to interrogate the fibre 110. For a light pulse with time duration $\tau$, this condition can be expressed as $$\frac{c}{n}\tau \leq \frac{L_B}{2}$$

where c is the speed of light and n is average isotropic refractive index of the fibre's core. This condition should hold across the range of pressures intended to be measured by the fibre 110.

Generally, the duration $\tau$ of the light pulse is as short as possible in order to maximise spatial resolution along the length of the fibre 110 of the signal generated by the photodetector 116 from light backscattered in the fibre 110 from the light pulse. However, the duration $\tau$ of the light pulse must be long enough that sufficient light is backscattered in the fibre 110 to be practically detectable by the photodetector 116. This should ideally be achieved without the light pulse having intensity great enough to cause unwanted and confusing non-linear effects in the backscatter process. In other words, the duration $\tau$ of the light pulse is limited to being above a given value, e.g. of the order of nanoseconds, or longer than a given spatial length, e.g. of the order of 10s of centimeters, so that a useful backscatter signal can be detected by the photodetector 116. So, importantly, there is a maximum birefringence $b_{max}$ measurable by this technique, which can be expressed as a minimum birefringence beat length $L_b$, and is around a level usually referred to as "low birefringence".

Figure 2:
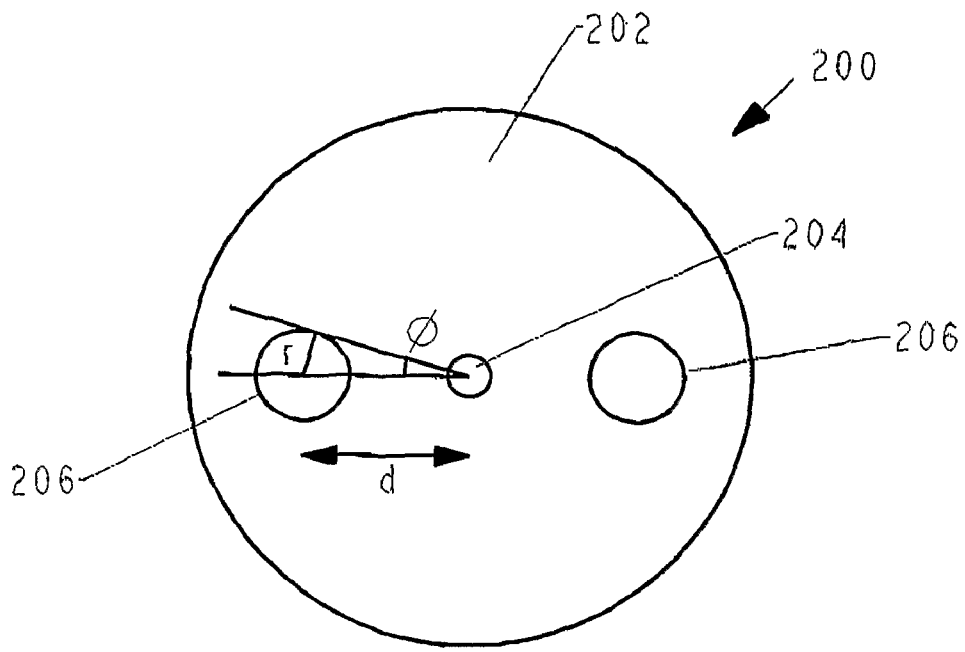
FIG. 2 is a schematic illustration showing a cross section of a side-hole optical fibre suitable for use in the present invention.

In one embodiment, the optical fibre 110 shown in FIG. 1 is a side-hole fibre 200 as shown in cross section in FIG. 2. This side-hole fibre 200 comprises a cladding 202 and a central core 204. Both of these are substantially cylindrical. On opposite sides of the core 204 are two holes 206 that extend parallel to the core 202 along the length of the fibre 200. In this embodiment, the holes 206 contain air, e.g. they are "air holes". In other embodiments, they may contain other gases or even solids or liquids, provided they are much more compressible than the material (e.g. silica) of the cladding 202. (In yet other embodiments, the material in the holes 206 may be less compressible than the material of the cladding, although this of course alters the orientation of the asymmetric compressibility of fibre 200 described below.) The holes 206 each have radius r. The distance d from the centre of the core 204 to the centre of each hole 206 is the same for each hole 206. Similarly, an angle $\Phi$ subtended by the radius r of each hole 206 about the centre of the core 204 (in other words the angle the between a straight line joining the centre of the core 204 and the centre of a respective hole 206 and a straight line joining the centre of the core 204 and the tangent of the hole 206) is the same for each hole 206. The presence of the holes 206 means that the core 204 of the fibre 200 experiences less stress in a direction (orthogonal or transverse to its length) that extends between the holes 206 than in other directions (orthogonal or transverse to its length) when isotropic external pressure is applied to the fibre 200. The core 204 therefore experiences less strain in that direction than others. In other words, the core 204 of the fibre 200 experiences asymmetric strain under the influence of external isotropic pressure.

In this embodiment, the intrinsic birefringence $b_0$ of the fibre 200 is low, very low or even negligible. In addition, the amount by which the birefringence b of the fibre 200 changes with applied external pressure is restricted. More specifically, the induced birefringence $b_i$ of the fibre 200 is kept low over the range of fluid pressures in which it is intended to use the fibre 200.

Figure 3:
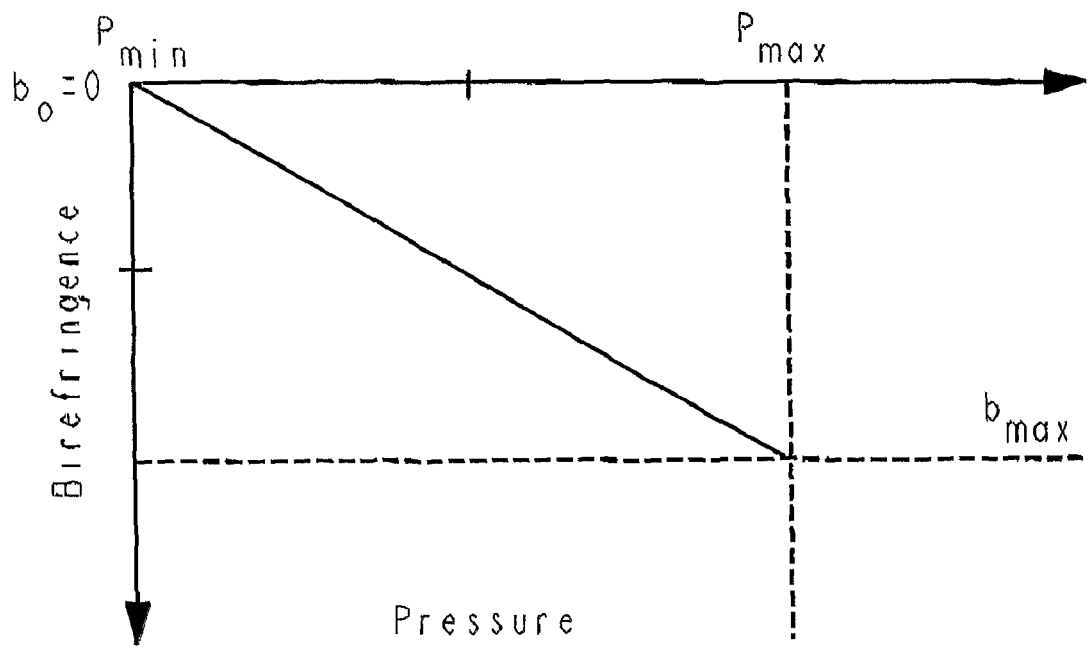
FIG. 3 is a graphical illustration of birefringence of the optical fibre illustrated in FIG. 2 versus pressure exerted on the fibre.

So, referring to FIG. 3, when the fibre 200 is in a neutral pressure environment, referred to as a minimum pressure $P_{min}$, the fibre 200 has only its low intrinsic birefringence $b_0$, illustrated as zero birefringence in FIG. 3. As the fibre 200 has increasing external isotropic pressure exerted on it, it experiences induced birefringence $b_i$, illustrated as negative in FIG. 3, which causes the birefringence b of the fibre 200 to change linearly with pressure. This induced birefringence $b_i$ is detectable until it reaches a (negative) maximum birefringence $b_{max}$. The maximum birefringence $b_{max}$ corresponds to a maximum pressure $P_{max}$ detectable by the fibre 200. So the fibre 200 is useful for measuring pressure in range extending from a minimum pressure $P_{min}$ to a maximum pressure $P_{max}$.

The rate of change of induced birefringence $b_i$ with exerted pressure and hence the maximum pressure $P_{max}$, corresponding to the maximum birefringence $b_{max}$ of the fibre 200, can be controlled using a suitable fibre construction. In particular, the dimensions and positioning of the holes 206 of the optical fibre 200 are carefully chosen. This can allow the strain experienced by the core 204 of the fibre 200 to be limited over the range of fluid pressures $P_{min}$ to $P_{max}$ in which it is intended to use the fibre 200. Limiting the strain experienced by the fibre 200 limits the induced birefringence $b_i$ of the fibre 200 at a given fluid pressure.

Table 1 below shows the range of fluid pressures $P_{min}$ to $P_{max}$ that can be measured using variations of the optical fibre 200 with holes 206 having different radii r and distances d from the centre of the core 204. In this example, the light pulses have duration τ of 1 ns and wavelength λ of 1550 nm; and the fibre 200 has intrinsic birefringence beat length of approximately 18.7 m, which is considered as negligible for simplicity here. The optical fibre 200 has a pure fused silica cladding and a lightly doped germanium core 204. It also has an overall diameter of around 125 μm and a core diameter of between around 8 μm to 10 μm.

TABLE 1

| d (μm) | r (μm) | Pressure Range (bar) |
| --- | --- | --- |
| 30 | 15 | 10 |
| 30 | 9 | 30 |
| 30 | 5 | 101 |
| 40 | 5 | 180 |
| 45 | 5 | 230 |
| 50 | 4 | 442 |
| 50 | 3 | 786 |
| 50 | 2 | 1770 |

So, broadly, the angle Φ subtended by the radius r of each hole 206 about the centre of the core 204 is less than around 10° for pressure ranges between around 100 bar and around 2000 bar and less than around 25° for pressure ranges between around 10 bar and around 100 bar.

However, one difficulty with this approach is that, as it is desired to measure increasingly high fluid pressures, the sensitivity of the measurement decreases. More specifically, the maximum birefringence $b_{max}$ that can be detected is fixed by the duration τ of the light pulse used to interrogate the fibre 200, as discussed above. The pressure range $P_{min}$ to $P_{max}$ detectable by the fibre 204 is therefore always effectively scaled across a fixed range of birefringence b, below this maximum birefringence $b_{max}$. As the pressure range $P_{min}$ to $P_{max}$ increases, the pressure change represented by a given change in birefringence b therefore increases. As the minimum pressure $P_{min}$ is fixed by the intrinsic birefringence of the fibre 200, higher pressures can only be measured with lower sensitivity.

Figure 4:
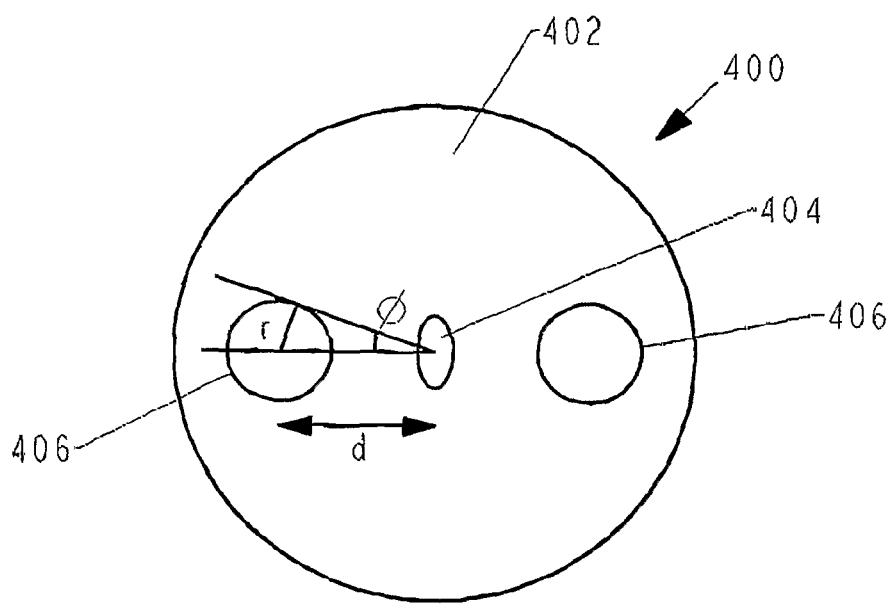
FIG. 4 is a schematic illustration showing a cross section of another side-hole fibre suitable for use in the present invention.

So, in another embodiment, referring to FIG. 4, the intrinsic birefringence $b_o$ of an optical fibre 400 is arranged to have opposite sign to the induced birefringence $b_i$ of the fibre 400 as the pressure exerted on the fibre 400 increases and its value is selected in accordance with the range of fluid pressures $P_{min}$ to $P_{max}$ over which it is intended to use the fibre. The construction of the optical fibre 400 illustrated in FIG. 4 is similar to the construction of the optical fibre 200 illustrated in FIG. 2. It is a side-hole fibre 400 having a cladding 402 and a central core 404. The cladding 402 is substantially cylindrical. However, the core 404 is substantially elliptical, rather than cylindrical. This means that the core 404 can have significantly different refractive indices n of the two polarisation eigenmodes of light propagated by the fibre 400 at neutral pressure. In other words, the fibre 400 can have appreciable intrinsic birefringence $b_0$, as described in more detail below.

Similarly to the optical fibre 200 illustrated in FIG. 2, the optical fibre 400 illustrated in FIG. 4 has holes 406 on each side of the core 404 that extend parallel to the core 402 along the length of the fibre 400. Again, the holes 406 can be air holes or they may contain other gases or even solids or liquids, as desired. The holes 406 each have radius r; the distance d from the centre of the core 404 to the centre of each hole 406 is the same for each hole 406; and the angle Φ subtended by the radius r of each hole 406 about the centre of the core 404 is the same for each hole 406. The dimensions and positioning of the holes 406 can be adjusted to vary the amount of strain experienced by the core 404 of the fibre for a given pressure in a similar way to the optical fibre 200 illustrated in FIG. 2.

Figure 5:
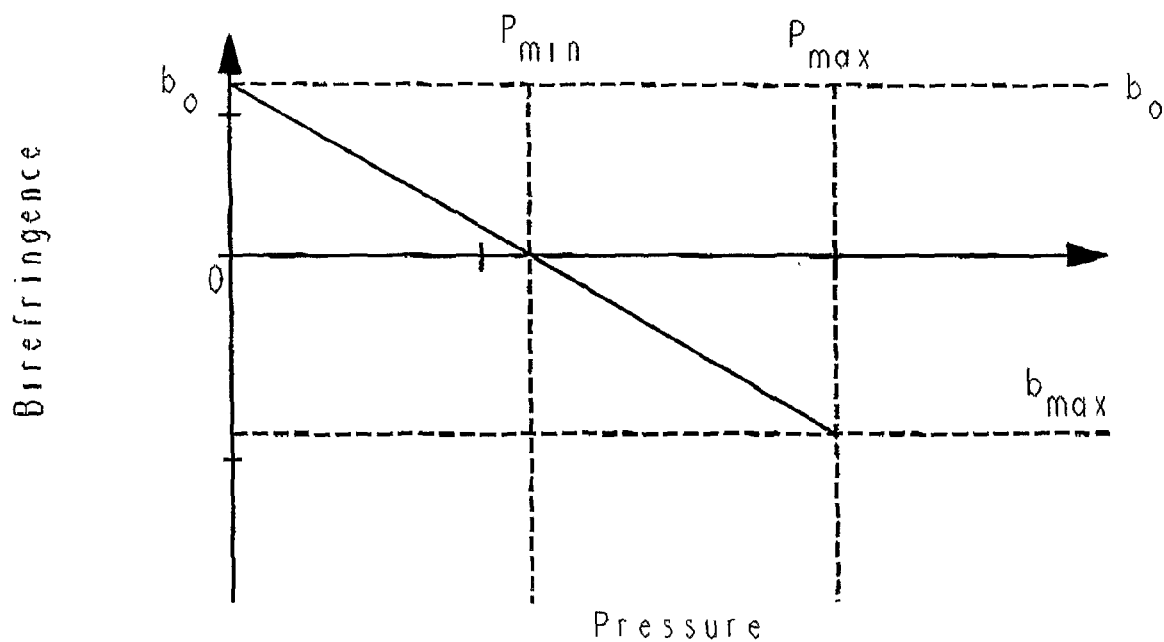
FIG. 5 is a graphical representation of birefringence of the optical fibre illustrated in FIG. 4 versus pressure exerted on the fibre.

Referring to FIG. 5, it can be appreciated that the intrinsic birefringence $b_0$ of the optical fibre 400 having opposite sign to the induced birefringence $b_i$ can allow the birefringence of the optical fibre 400 to decrease as the pressure exerted on it increases. If the intrinsic birefringence $b_0$ of the fibre 400 is higher than the (modulus of) maximum birefringence $b_{max}$, pressures close to the neutral pressure of the fibre 400, e.g. close to atmospheric pressure are not detectable. However, as the pressure increases, the induced birefringence $b_i$ of the fibre 400 subtracts from the intrinsic birefringence $b_0$ of the fibre 400 and the birefringence b of the fibre 400 decreases. Once a pressure at which the birefringence of the fibre 400 decreases below the maximum birefringence $b_{max}$, the birefringence of the fibre 400 becomes detectable. However, the technique of detecting fibre birefringence b described in this document actually measures the modulus of the fibre's birefringence b. It is therefore preferred that the fibre 400 is used to detect a range of pressures $P_{min}$ to $P_{max}$ for which the minimum pressure $P_{min}$ corresponds to substantially zero birefringence. This avoids ambiguity in the determination of pressure. So, referring again to FIG. 5, the range of pressures $P_{min}$ to $P_{max}$ detectable by the fibre 400 extends from a minimum pressure $P_{min}$ at which the sum of the fibre's intrinsic birefringence $b_0$ and the fibre's induced birefringence $b_i$ is substantially zero and a maximum pressure $P_{max}$ at which the sum of the fibre's intrinsic birefringence $b_0$ and the fibre's induced birefringence $b_i$ is substantially equal to the (negative or modulus) maximum measurable birefringence $b_{max}$ of the fibre 400.

In further embodiments, careful selection of the intrinsic birefringence $b_0$ of the optical fibre 400 and the rate of change of induced birefringence $b_i$ with pressure can allow the optical fibre 400 to be used to measure pressure over a variety of different pressure ranges $P_{min}$ to $P_{max}$. Generally, the birefringence of the fibre 400 can be expressed as a function of the isotropic pressure exerted on the fibre 400, e.g.

$$b(P) = \alpha(P - P_{min})$$

where α is a birefringence pressure sensitivity coefficient for the optical fibre 400, determined by the size and positions of the holes 406 of the fibre for example. The sensitivity coefficient α can be expressed in terms of the maximum detectable fibre birefringence $b_{max}$ and the desired pressure range $P_{min}$ to $P_{max}$, e.g.

$$\alpha = \frac{b_{max}}{(P_{max} - P_{min})}$$

In this Embodiment, the Sensitivity Coefficient α, Rate of Change of induced birefringence $b_i$ with isotropic pressure exerted on the fibre 400 or, broadly, fibre "sensitivity" can be varied by changing the dimensions and positions of the holes 406, as described in relation to the optical fibre 200 illustrated in FIG. 2. The intrinsic birefringence of the optical fibre 400 can be expressed in terms of the sensitivity coefficient α and the desired minimum detectable pressure (or pressure at which the sum of the fibre's intrinsic birefringence $b_0$ and the fibre's induced birefringence $b_i$ is substantially zero), e.g.

$$|b_0| = |\alpha P_{min}|$$

The level of intrinsic birefringence $b_0$ of the fibre 400 can be varied by varying the ellipticity of the core. The typical values of intrinsic birefringence $b_0$ required are less then those current commercially available elliptical core optical fibres, e.g. less then around $2 \times 10^{-4}$. The ratio of ellipticity of the core 404 is therefore likely to be less than in those fibres, e.g. less than around 1:2.5. The level of intrinsic birefringence $b_0$ of the fibre 400 can also be varied by altering the materials from which the optical fibre 400 is made and, in particular, the doping of the core 404. Again, doping the core 404 to have a lower refractive index than levels than most current commercially available elliptical core optical fibres is likely to be appropriate.

Figure 6:
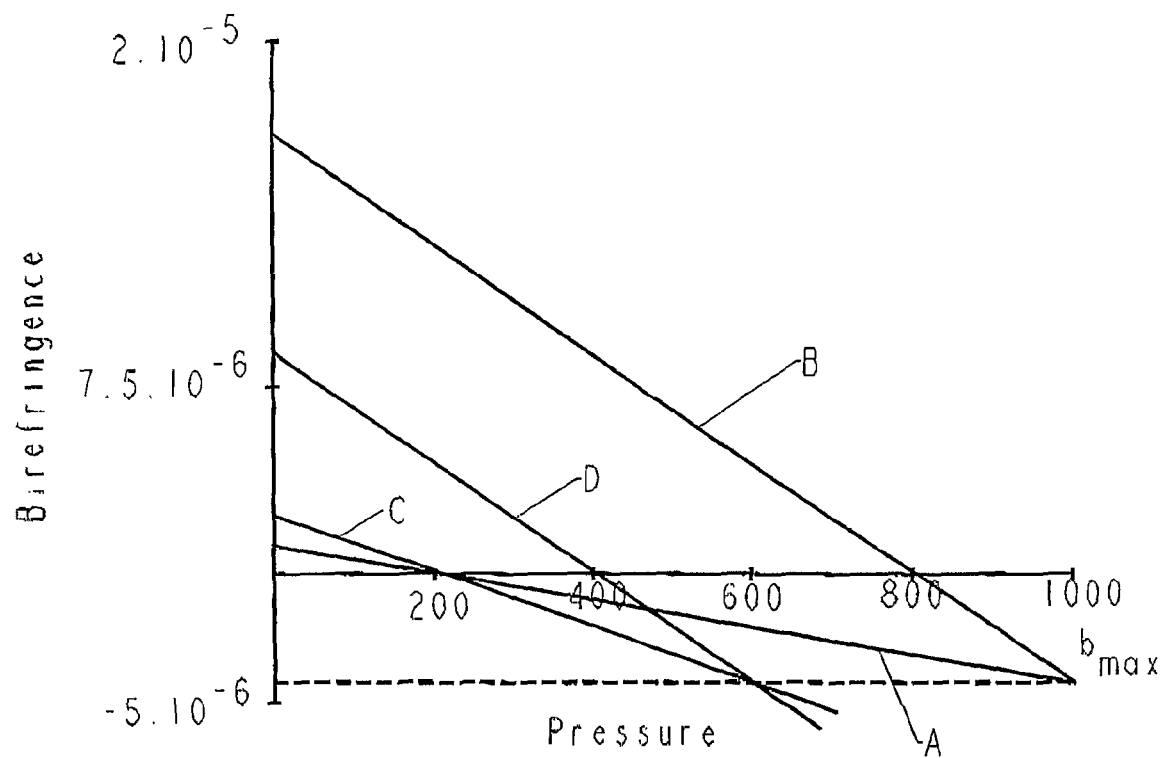
FIG. 6 is a graphical representation of birefringence of variations of the optical fibre illustrated in FIG. 4 versus pressure exerted on the fibre.

Some examples of different pressure ranges $P_{min}$ to $P_{max}$ are illustrated in FIG. 6. Line A represents a variation of optical fibre 400 having an intrinsic birefringence $b_0$ and sensitivity coefficient α chosen such that the fibre 400 has a pressure range $P_{min}$ to $P_{max}$ from 200 bar to 1000 bar. Line B represents a variation of optical fibre 400 having an intrinsic birefringence $b_0$ and sensitivity coefficient α chosen such that the fibre 400 has a pressure range $P_{min}$ to $P_{max}$ from 800 bar to 1000 bar. Line C represents a variation of optical fibre 400 having an intrinsic birefringence $b_0$ and sensitivity coefficient α chosen such that the fibre 400 has a pressure range $P_{min}$ to $P_{max}$ from 200 bar to 600 bar. Line d represents a variation of optical fibre 400 having an intrinsic birefringence $b_0$ and sensitivity coefficient α chosen such that the fibre 400 has a pressure range $P_{min}$ to $P_{max}$ from 400 bar to 600 bar. In each of these examples, the maximum detectable fibre birefringence $b_{max}$ is taken as around $3.9 \times 10^{-6}$, which corresponds to a birefringence beat length $L_b$ of around 40 cm at an operating wavelength λ of around 1550 nm.

Figure 7:
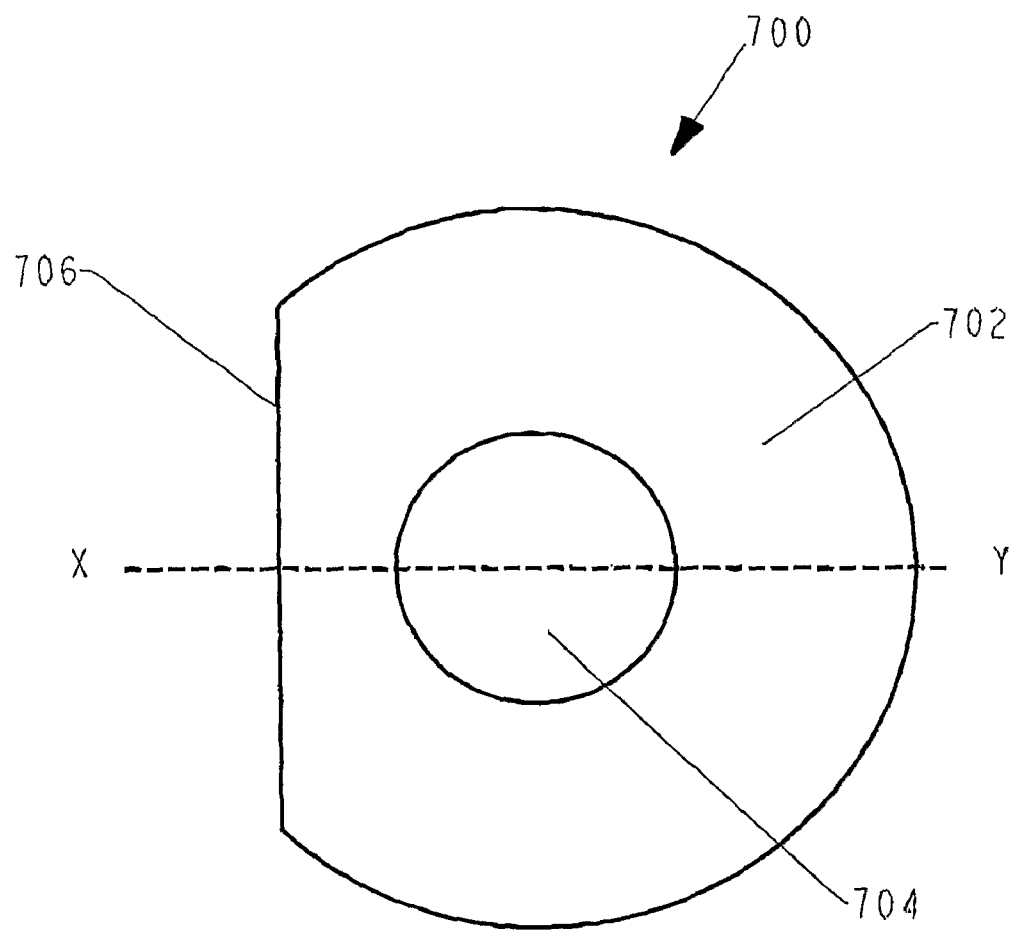
FIG. 7 is a schematic illustration showing a cross section of a D-shape optical fibre suitable for use in the present invention.

In another example, the optical fibre 110 shown in FIG. 1 is a low birefringence D-shaped fibre 700 as shown in FIG. 7. The D-shaped fibre 700 has a cladding 702 and a core 704. The core 704 is cylindrical (or elliptical) and the cladding 702 extends around the core 704. So, the inside surface of the cladding 702 is cylindrical (or elliptical). In other words, the core-cladding interface has circular (or elliptical) cross-section. However, whilst the majority of the outer wall of the cladding 704 is cylindrical, a section of the cladding 702 is effectively cut away. This leaves a flat surface 706 on one side of the optical fibre 700 and the optical fibre 700 is narrowest in a direction x-y perpendicularly bisecting the surface 706 along its width and passing through the centre of the core 704. The D-shaped fibre 700 is therefore more compressible in the direction x-y than in other directions. This makes it similar to the side-hole fibres 200; 300 in that, when the D-shaped fibre 700 experiences isotropic external pressure, the core 704 experiences less strain in the direction x-y than in other directions.

The D-shaped fibre 700 has similar constraints on its birefringence to those of the side-hole fibres 200; 300. In other words, it should ideally have sufficiently low intrinsic birefringence to allow resolution of its birefringence properties using light pulses of duration that are practically producible and detectable; and the local birefringence that it experiences with applied external pressure must be sufficiently small that this remains that case over the pressure range it is intended to measure. However, the intrinsic birefringence and sensitivity of the optical fibre 700 can be selected in similar ways to the optical fibres 200; 400 illustrated in FIGS. 2 and 4 to select a pressure range for the optical fibre 700, as desired.

Of course, other suitable optical fibre designs will occur to the skilled person. For example, the optical fibre 110 may be a photonic crystal fibre (PCF) rather than having a conventional silica core and cladding. Likewise, the optical fibre 110 may be adapted to deform asymmetrically transverse to its length on application of substantially isotropic pressure in an almost endless variety of ways.

Pressure Measurement

In use, the optical fibre 110 is first calibrated in a neutral pressure environment, e.g. in air at atmospheric pressure. This involves mapping the intrinsic birefringence of the fibre 110 along the length of the fibre 110 that it is intended to use for pressure measurement. The fibre 110 can then be immersed in a fluid (not shown), the pressure of which it is desired to measure. In most cases the fluid is a liquid such as water or oil, but the invention is not limited to measurement of pressure in these liquids. Pressure in gases or liquid suspensions can also be measured.

The birefringence measurement which is made is that of the spatial distribution of linear retardance δ per unit length z, i.e. δ(z). This is related to the birefringence b(z) by $$\delta(z) = \frac{2\pi}{\lambda} b(z)$$

where λ is the wavelength of the light pulse.

For operation at a single wavelength λ, δ(z) can be calculated by employing two input polarization states; for example, two linear states separated by an angle of 45°. The reason for this is that if one of the local propagating states is linear and lies along one of the axes of a linearly birefringent local section of the fibre 110, no information on the retardance δ between the eigenmodes is available. In this case, the input polarization state orientated at 45° will provide a local linear polarisation state now at 45° to the local birefringence axis of the section, and the required information is recoverable. So, the PPU 104 transmits two light pulses, each linearly polarised at 45° to one another.

Figure 8:
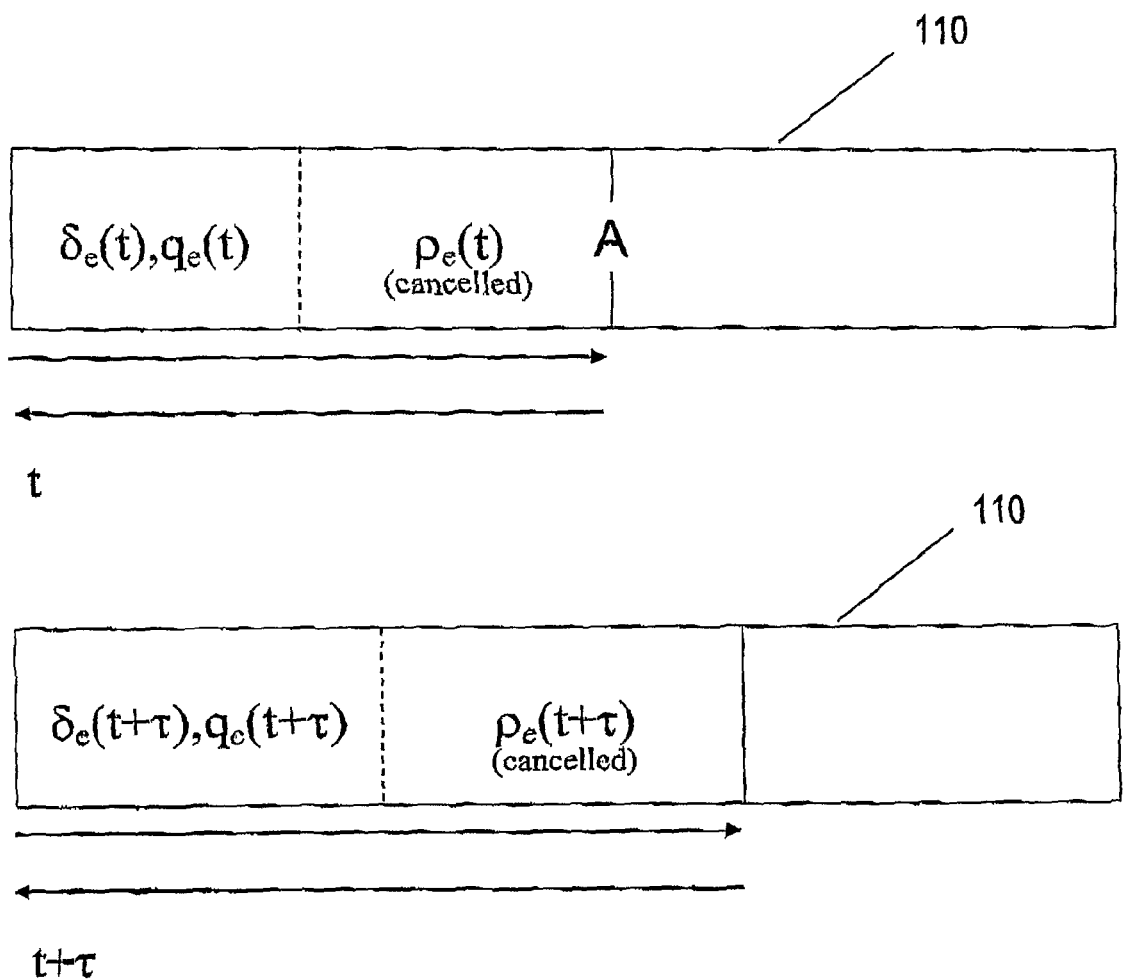
FIG. 8 is a longitudinal, sectional view of an optical fibre illustrating operation of the apparatus of FIG. 1 for measuring pressure.

Referring to FIG. 8, at time t the light backscattered from the propagating light pulse returns from point A in the fibre 110. The length of fibre 110 up to point A is equivalent, polarimetrically, to a retarder/rotator pair. The retardation of the equivalent linear retarder is $\delta_e(z)$ and the orientation of its axes is $q_e(z)$. The rotation induced by the rotator is $\rho_e(z)$. In backscatter, the rotator $\rho_e(z)$ is cancelled. Consequently, at successive values of t, e.g. t+τ (z and t are related by 2z=ct, in backscatter) what are effectively measured are $\delta_e(t)$ and $q_e(t)$, with a temporal/spatial resolution determined by the width of the optical pulses and the response time of the photodetector 116, whichever is the longer.

As mentioned above, the PPU 104 and photodetector 116 actually physically measure the Stokes parameters of the backscattered light, as a function of time, for light pulses having the two input polarization states. The Stokes parameters define the 'instantaneous' polarization state of the backscattered light. This information allows δ(z) to be calculated from the values of the Stokes parameters and their time derivatives. δ(z) can then be related directly to the distribution of pressure along the fibre 110.

Flow Measurement

According to Bernoulli's law, pressure P in a moving fluid can be expressed as $$P = P_0 + \rho g h + \frac{1}{2}\rho v^2$$

where $P_0$ is static pressure, ρ is fluid density, g is gravitational acceleration, h is the height of fluid above a reference surface and υ is the local fluid velocity at the position where the pressure is estimated. So, for example, an underwater current with a speed around 5 m/s may create a dynamic pressure of 0.125 bar in addition to the static pressure at the depth of the current. Fluid flow can therefore be determined by measuring isotropic pressure.

Figure 9:
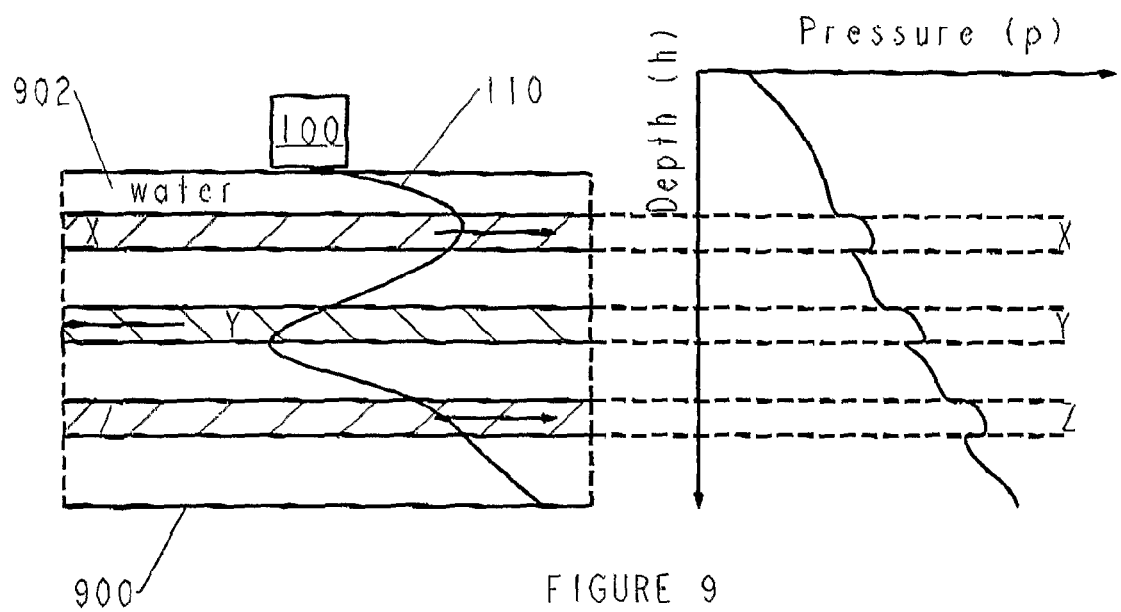
FIG. 9 is a schematic illustration of an optical fibre disposed for measuring fluid flow, along with a graphical representation of pressure against fluid depth.

In order to determine fluid flow, the optical fibre 110 is positioned transverse to the direction of fluid flow. Referring to FIG. 9, in one embodiment, the fibre 110 is secured at one end to the seabed 900, for example using a suitable weight or anchor (not shown), and the apparatus 100 is mounted on a sea vessel or buoy (not shown) at the sea surface 902. The apparatus 100 is used to derive a distribution of external isotropic pressure along the length of the fibre 110 from the sea surface 902 to the seabed 900.

An example of the determined pressure distribution is shown in graphical form in FIG. 9. As expected, the pressure increases proportionally with water depth. However, where there are currents X, Y, Z in the water, i.e. the water is flowing; the pressure is increased out of proportion with the corresponding depth. In particular, the boundaries of the currents X, Y, Z, are characterized by step-like changes in pressure. The depth of these boundaries is identified either by looking at the distance along the fibre 110 at which they occur or by looking at the static pressure of the water in the region of the current. The dynamic pressure of the water in the currents X, Y, Z can also be used to determine current velocity, using Bernoulli's law above.

In another embodiment (not shown), at least part of the optical fibre 110 is held horizontally in the sea using buoys. This means that the static pressure of the water surrounding the part of the fibre 110 held horizontal is the same along the length of that part of the fibre 110. Any change in fibre birefringence b along that part of the fibre 110 can therefore be attributed to dynamic pressure, i.e. currents in the water.

In yet another embodiment (not shown), the optical fibre 110 can be arranged as a grid or several optical fibres 110 can be used to form a grid. The grid can be laid so that the plane it forms is horizontal or vertical in the sea. This allows two dimensional imaging of sea currents.

Location of an Oil/Water Interface

Figure 10:
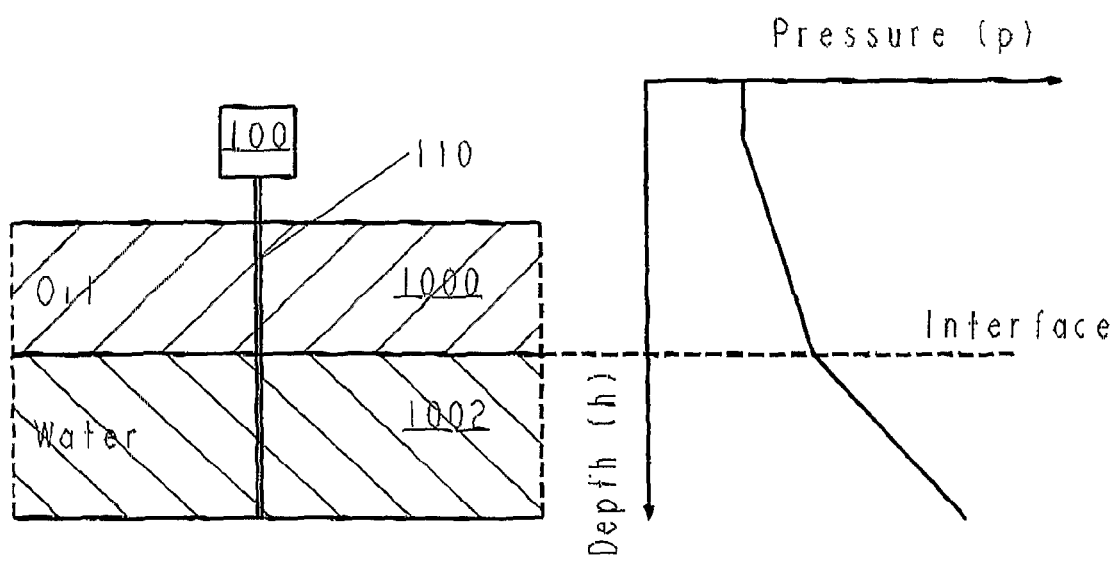
FIG. 10 is a schematic illustration of an optical fibre disposed for location of an oil/water interface, along with a graphical representation of pressure against fluid depth.

Referring to FIG. 10, a cavity or vessel, such as an oil reservoir, contains both oil 1000 and water 1002. As oil 1000 is lighter than water 1002 and the two fluids are immiscible, the oil 1000 sits on top of the water 1002. It can be useful to detect the level of oil 1000 in the reservoir, for example to aid extraction.

Fluid pressure increases linearly with depth according to $$p = \rho g h$$

where p is the isotropic fluid pressure, ρ fluid density, g is acceleration due to gravity and h is the depth below the surface. So, $$\frac{dp}{dh} = \rho g$$

This means that, when fluid density ρ changes abruptly, e.g. at an oil/water interface, the gradient of pressure with depth h changes. This is illustrated graphically on the right hand side of FIG. 10.

To locate an oil/water interface, optical fibre 110 is therefore immersed in the reservoir and apparatus 100 used to determine the distribution of birefringence b along the length of the fibre 110. By looking at the gradient of the birefringence b along the length of the fibre 110, it is possible to identify a change in fluid density ρ and hence determine the depth of the oil/water interface.

Tsunami Detection

Tsunamis are large waves, most commonly generated by earthquakes that have their epicentre undersea or by landslides into the sea. These waves can hit coastlines with catastrophic consequences and it is generally desirable to be able to detect the approach of tsunamis effectively with a view to providing early warning to coastal communities.

One important feature of tsunamis that distinguishes them from other water waves is that they comprise a significant fluctuation in pressure throughout the depth of the water in which they travel. So, it is possible to detect a tsunami using a pressure sensor placed underwater or on the seabed.

Accordingly, one or more optical fibres 110 are laid along the seabed extending out to sea from the coastline. In this embodiment, each optical fibre 110 has its own dedicated apparatus 100 that interrogates the fibre 110 periodically to determine the distribution of birefringence b along the length of the fibre 110. Changes in the distribution of birefringence b can be indicative of changes in pressure along the length of the fibre 110.

Figure 11:
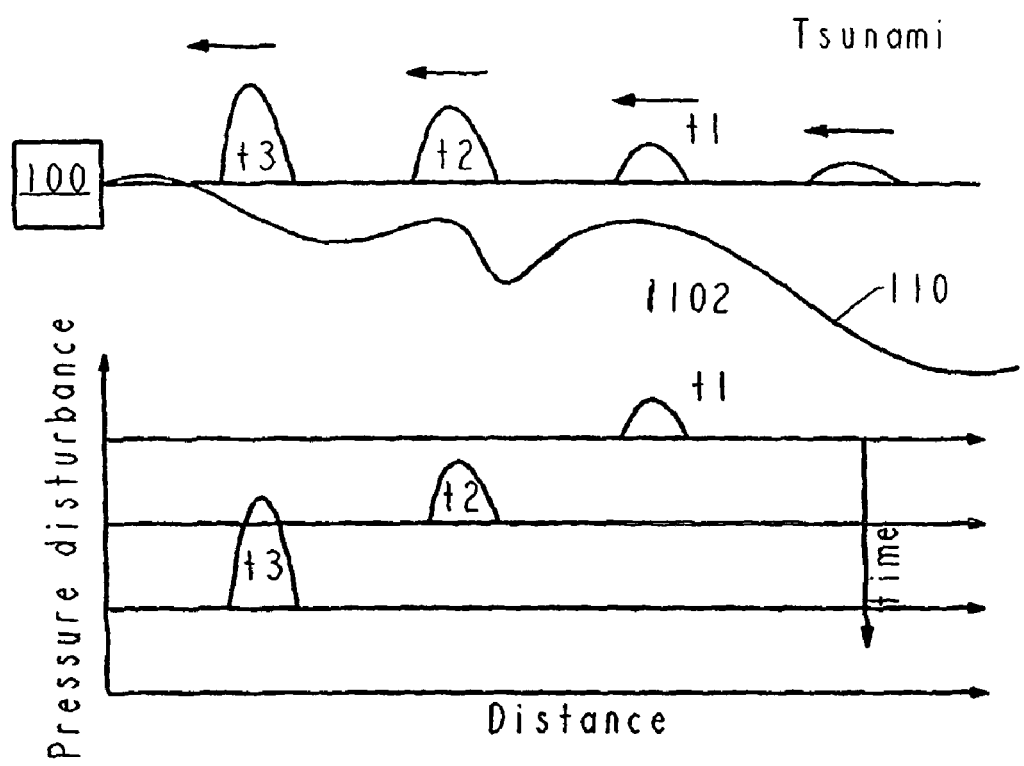
FIG. 11 is a schematic illustration of an optical fibre disposed for tsunami detection, along with a graphical representation of pressure against position along at three distinct times.

Referring to FIG. 11, a single optical fibre 110 is laid along the seabed 1102, with the detection apparatus 100 located at the coast. As a tsunami travels through the water, an increase in water pressure occurs along the length of the fibre; leading to change in fibre birefringence b detected by the apparatus 100. The change in fibre birefringence b at successive times $t_1$, $t_2$ and $t_3$ is closer to apparatus 100 and hence the coastline, indicating a tsunami travelling toward the coastline. The strength and speed of the tsunami can be derived from the measured change in fibre birefringence b.

In other embodiments, multiple fibres 110 can be used to characterise the propagation of the wave in two dimensions. This can give more information on the wave's direction and help to eliminate spurious wave events.

The described embodiments of the invention are only examples of how the invention may be implemented. Modifications, variations and changes to the described embodiments will occur to those having appropriate skills and knowledge. These modifications, variations and changes may be made without departure from the spirit and scope of the invention defined in the claims and its equivalents.

The invention claimed is:

1. An apparatus for detecting pressure distribution in a fluid, the apparatus comprising:
   an optical waveguide for submersion in the fluid, the optical waveguide being adapted to deform asymmetrically transverse to its length on exertion of substantially isotropic pressure by the fluid such that birefringence of the waveguide varies with the exerted pressure;
   a light source for directing pulses of light into the waveguide;
   a polarisation detector for detecting polarisation states of light backscattered from the light pulses in the waveguide; and
   a processor for deriving an indication of the birefringence of at least part of the waveguide from the detected polarisation states to detect pressure distribution in the fluid.

2. The apparatus of claim 1, wherein the optical waveguide is a side-hole optical fibre.

3. The apparatus of claim 2, wherein the side-hole fibre has two holes, one on either side of the fibre's core, and the angle subtended by the radius of each hole around the centre of the core is less than around 25°.

4. The apparatus of claim 2, wherein the side-hole fibre has two holes, one on either side of the fibre's core, and the angle subtended by the radius of each hole around the centre of the core is less than around 10°.

5. The apparatus of claim 1, wherein the optical waveguide is a D-shaped optical fibre.

6. The apparatus of claim 1, wherein the polarisation detector is able to detect the polarisation state of light following backscattering at different points along the length of the waveguide and the at least part of the waveguide for which the processor derives an indication of birefringence is between at least some of these points.

7. The apparatus of claim 1, wherein the processor derives an indication of the variation of birefringence along the length of the waveguide to detect spatial pressure distribution in the fluid.

8. The apparatus of claim 1, wherein the processor derives an indication of the birefringence of the at least part of the waveguide more than once to detect temporal pressure distribution in the fluid.

9. The apparatus of claim 1, wherein the optical waveguide is adapted to be placed in a down-hole of an oil well for detecting pressure distribution of fluid in the down-hole.

10. The apparatus of claim 1, wherein the optical waveguide is adapted to be placed in a water pipe for detecting pressure distribution of water in the pipe.

11. An apparatus for detecting fluid flow, the apparatus comprising: the apparatus of claim 1 wherein the derived indication detects the distribution along the waveguide of the pressure exerted by the fluid on the waveguide; and means for distinguishing a component of the indication resulting from static fluid pressure from a component of the indication resulting from fluid flow.

12. An apparatus for locating an interface between two fluids of different density, the apparatus comprising the apparatus of claim 1, wherein the optical waveguide is able to extend through the fluids, and means for locating a change in the gradient of the detected pressure distribution along the waveguide to locate the fluid interface.

13. An apparatus for detecting a tsunami, the apparatus comprising the apparatus of claim 1, wherein the optical waveguide is able to extend underwater along an expected path of the tsunami, the processor derives an indication of the distribution along the waveguide of the pressure exerted by the water on the waveguide and the apparatus has means for determining when changes in the distribution are characteristic of a tsunami travelling through the water along the expected path.

14. The apparatus of claim 1, comprising more than one waveguide.

15. The apparatus of claim 1, wherein the optical waveguide extends for several tens of kilometers.

16. The apparatus of claim 1, wherein the birefringence beat length of the optical waveguide remains more than about 1 m over the range of fluid pressures in which it is intended to use the waveguide.

17. The apparatus of claim 1, wherein the optical waveguide has intrinsic birefringence beat length longer than around 10 m.

18. The apparatus of claim 1, wherein the waveguide is arranged such that birefringence induced by increasing fluid pressure opposes (the) intrinsic birefringence of the waveguide.

19. The apparatus of claim 1, wherein the waveguide has a value of intrinsic birefringence selected such that the waveguide has substantially zero birefringence at a pressure offset from atmospheric pressure to define a range of fluid pressures detectable using the waveguide.

20. The apparatus of claim 1, wherein the waveguide has deformability selected to control the rate of change of induced birefringence with increasing fluid pressure and thereby to define a/the range of fluid pressures detectable using the waveguide.

21. The apparatus of claim 1, wherein the waveguide comprises an optical fibre having an elliptical core.

22. The apparatus of claim 1, wherein the birefringence beat length of the optical waveguide remains above around two times the length of the light pulses over the range of fluid pressures in which it is intended to use the waveguide.

23. An optical waveguide for use in detecting pressure distribution in a fluid, the waveguide being adapted to deform asymmetrically transverse to its length on exertion of substantially isotropic pressure by the fluid such that the birefringence of the waveguide varies with the exerted pressure.

24. The waveguide of claim 23, wherein the birefringence beat length of the optical waveguide remains more than about 1 m over the range of fluid pressures in which it is intended to use the waveguide.

25. The optical waveguide of claim 23, having intrinsic birefringence beat length longer than 10 m.

26. The waveguide of claim 23, arranged such that birefringence induced by increasing fluid pressure opposes (the) intrinsic birefringence of the waveguide.

27. The waveguide of claim 23, having a value of intrinsic birefringence selected such that the waveguide has substantially zero birefringence at a pressure offset from atmospheric pressure to define a range of fluid pressures detectable using the waveguide.

28. The waveguide of claim 23, having deformability selected to control the rate of change of induced birefringence with increasing fluid pressure and thereby to define a/the range of fluid pressures detectable using the waveguide.

29. The waveguide of claim 23, comprising a side-hole optical fibre.

30. The waveguide of claim 23, comprising an optical fibre having an elliptical core.

31. The waveguide of claim 23, having birefringence beat length that remains above around two times the length of light pulses used to interrogate the waveguide over the range of fluid pressures in which it is intended to use the waveguide.

32. A method of detecting pressure distribution in a fluid using an optical waveguide for submersion in the fluid, the optical waveguide being adapted to deform asymmetrically transverse to its length on exertion of substantially isotropic pressure by the fluid such that birefringence of the waveguide varies with the exerted pressure, the method comprising:

directing pulses of light into the waveguide;

detecting polarisation states of light backscattered from the light pulses in the waveguide; and deriving an indication of the birefringence of at least part of the waveguide from the detected polarisation states to detect pressure distribution in the fluid.

33. The method of claim 32, wherein the optical waveguide is a side-hole optical fibre.

34. The method of claim 33, wherein the side-hole fibre has two holes, one on either side of the fibre's core, and the angle subtended by the radius of each hole around the centre of the core is less than around 25°.

35. The method of claim 33, wherein the side-hole fibre has two holes, one on either side of the fibre's core, and the angle subtended by the radius of each hole around the centre of the core is less than around 10°.

36. The method of claim 32, wherein the optical waveguide is a D-shaped optical fibre.

37. The method of claim 32, comprising detecting the polarisation state of light following backscattering at different points along the length of the waveguide and wherein the at least part of the waveguide for which the indication of birefringence is determined is between at least some of these points.

38. The method of claim 32, comprising deriving an indication of the variation of birefringence along the length of the waveguide to detect spatial pressure distribution in the fluid.

39. The method of claim 32, comprising deriving an indication of the birefringence of the at least part of the waveguide more than once to detect temporal pressure distribution in the fluid.

40. The method of claim 32, wherein the optical waveguide is placed in a down-hole of an oil well and the pressure distribution of fluid in the down-hole is detected.

41. The method of claim 32, wherein the optical waveguide is placed in a water pipe and the pressure distribution of water in the water pipe is detected.

42. A method of detecting fluid flow, the method comprising: using the method of claim 32, wherein the derived indication detects the distribution along the waveguide of the pressure exerted by the fluid on the waveguide; and distinguishing a component of the indication resulting from static fluid pressure from a component of the indication resulting from fluid flow.

43. A method of locating an interface between two fluids of different density, the method comprising the method of claim 32, wherein the optical waveguide extends through the fluids, and locating a change in the gradient of the detected pressure distribution along the waveguide to locate the fluid interface.

44. A method of detecting a tsunami, the method comprising the method of claim 32, wherein the optical waveguide extends underwater along an expected path of a tsunami, the derived indication is of the distribution along the waveguide of the pressure exerted by the water on the waveguide, and determining when changes in the distribution are characteristic of a tsunami travelling through the water along the expected path.

45. The method of claim 32, comprising more than one waveguide.

46. The method of claim 32, wherein the optical waveguide extends for several tens of kilometers.

47. The method of claim 32, wherein the birefringence beat length of the optical waveguide remains more than about 1 m over the range of fluid pressures in which it is intended to use the waveguide.

48. The method of claim 32, wherein the optical waveguide has intrinsic birefringence beat length longer than around 10 m.

49. The method of claim 32, wherein the waveguide is arranged such that birefringence induced by increasing fluid pressure opposes (the) intrinsic birefringence of the waveguide.

50. The method of claim 32, comprising selecting a value of intrinsic birefringence such that the waveguide has substantially zero birefringence at a pressure offset from atmospheric pressure to define a range of fluid pressures detectable using the waveguide.

51. The method of claim 32, comprising selecting the deformability of the waveguide to control the rate of change of induced birefringence with increasing fluid pressure and thereby to define a/the range of fluid pressures detectable using the waveguide.

52. The method of claim 32, comprising an optical fibre having an elliptical core.

53. The method of claim 32, wherein the birefringence beat length of the optical waveguide remains above around two times the length of (the) light pulses (used to interrogate the waveguide) over the range of fluid pressures in which it is intended to use the waveguide.

54. A non-transitory computer readable medium comprising a program code adapted to carry out the method of claim 32 when processed by a processing means.

55. A method of detecting pressure distribution in a fluid using a waveguide adapted to deform asymmetrically transverse to its length on exertion of substantially isotropic pressure by the fluid such that the birefringence of the waveguide varies with exerted pressure.

56. The method of claim 55, wherein the birefringence beat length of the optical waveguide remains more than 1 m over the range of fluid pressures in which it is intended to use the waveguide.

57. The method of claim 55, wherein the optical waveguide has intrinsic birefringence beat length longer than around 10 m.

58. The method of claim 55, wherein the waveguide is arranged such that birefringence induced by increasing fluid pressure opposes (the) intrinsic birefringence of the waveguide.

59. The method of claim 55, comprising selecting a value of intrinsic birefringence such that the waveguide has substantially zero birefringence at a pressure offset from atmospheric pressure to define a range of fluid pressures detectable using the waveguide.

60. The method of claim 55, comprising selecting the deformability of the waveguide to control the rate of change of induced birefringence with increasing fluid pressure and thereby to define a/the range of fluid pressures detectable using the waveguide.

61. The method of claim 55, comprising an optical fibre having an elliptical core.

62. The method of claim 55, wherein the birefringence beat length of the optical waveguide remains above around two times the length of (the) light pulses (used to interrogate the waveguide) over the range of fluid pressures in which it is intended to use the waveguide.

* * * * *